US011769386B2

(12) United States Patent
Schwerdtfeger et al.

(10) Patent No.: US 11,769,386 B2
(45) Date of Patent: Sep. 26, 2023

(54) PREVENTING THE NUMBER OF MEETING ATTENDEES AT A VIDEOCONFERENCING ENDPOINT FROM BECOMING UNSAFE

(71) Applicant: Plantronics, Inc., Santa Cruz, CA (US)

(72) Inventors: Jeffrey Schwerdtfeger, Santa Cruz, CA (US); Robert Manassero, II, Santa Cruz, CA (US); Geoffrey Dean Jensen, Carpinteria, CA (US); Sean Michael Burke, Santa Cruz, CA (US); Kem Gallione, Santa Cruz, CA (US); Ryan Michael Dalke, Santa Cruz, CA (US); Brian Jensen, Soquel, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 17/445,221

(22) Filed: Aug. 17, 2021

(65) Prior Publication Data
US 2022/0051541 A1 Feb. 17, 2022

Related U.S. Application Data

(60) Provisional application No. 63/066,459, filed on Aug. 17, 2020.

(51) Int. Cl.
*G08B 21/02* (2006.01)
*H04L 65/403* (2022.01)
(Continued)

(52) U.S. Cl.
CPC ............ *G08B 21/02* (2013.01); *H04L 65/403* (2013.01); *H04L 67/52* (2022.05); *H04L 67/54* (2022.05)

(58) Field of Classification Search
CPC ....... G08B 21/02; H04L 65/403; H04L 67/18; H04L 67/24
See application file for complete search history.

(56) References Cited

U.S. PATENT DOCUMENTS 9,912,908 B2 3/2018 Feng
10,187,579 B1 1/2019 Wang et al.
(Continued)

OTHER PUBLICATIONS

Webex Team "Returning to work with Intelligent Room Capacity". Webex Blog Jun. 10, 2020. https://blog.webex.com/collaboration-devices/returning-to-work-with-intelligent-room-capacity/.*
(Continued)

*Primary Examiner* — Chris Parry
*Assistant Examiner* — Steven C Nguyen
(74) *Attorney, Agent, or Firm* — QUARLES & BRADY LLP

(57) ABSTRACT

Systems and methods of managing videoconferencing endpoint capacity based on safety concerns (e.g., COVID-19), comprising: capturing a video feed corresponding to a geographic location; detecting a presence of one or more persons corresponding to the geographic location, based on data of the video feed; determining a quantity of persons corresponding to the geographic location, based the data of the video feed; determining that the quantity of persons corresponding to the geographic location exceeds a first predetermined threshold; and—in response to the determination that the quantity of persons corresponding to the geographic location exceeds the first predetermined threshold—issuing one or more alert messages and/or taking other appropriate action(s).

17 Claims, 8 Drawing Sheets

(51) Int. Cl.
*H04L 67/52* (2022.01)
*H04L 67/54* (2022.01)

(56) References Cited

U.S. PATENT DOCUMENTS

| | | | |
|---|---|---|---|
| 10,389,977 B1* | 8/2019 | Van Os | H04M 1/72439 |
| 2015/0169069 A1* | 6/2015 | Lo | H04L 65/403 |
| | | | 715/753 |
| 2018/0205797 A1* | 7/2018 | Faulkner | H04L 67/14 |
| 2019/0007623 A1* | 1/2019 | Wang | G06V 40/103 |
| 2020/0289698 A1* | 9/2020 | Polidoro | A61L 9/20 |
| 2020/0327462 A1* | 10/2020 | Marianko | H04L 67/10 |
| 2021/0185276 A1* | 6/2021 | Peters | G06V 20/41 |
| 2021/0313075 A1* | 10/2021 | Mc Namara | G08B 21/22 |
| 2022/0028535 A1* | 1/2022 | Ryan | G16H 50/20 |
| 2022/0053100 A1* | 2/2022 | Su | H04N 1/00408 |
| 2022/0319063 A1* | 10/2022 | Mizobuchi | H04L 65/403 |

OTHER PUBLICATIONS

World Health Organization, "Getting your workplace ready for COVID-19" Mar. 3, 2020. pp. 1-8 (Year: 2020).*

Sannesmoen, Marte Holt. "How to Ensure a Safe Return Back to the Office with Cisco Webex Rooms and Appspace." Cisco Blogs, Oct. 23, 2020, Retrieved Aug. 31, 2021 from https://blogs.cisco.com/collaboration/how-to-ensure-a-safe-return-back-to-the-office-with-cisco-webex-rooms-and-appspace.

"Returning to work with intelligent room capacity" is locked returning to work with intelligent room capacity. (Jun. 8, 2021). Retrieved Aug. 31, 2021, from https://blog.webex.com/collaboration-devices/returning-to-work-with-intelligent-room-capacity/.

\* cited by examiner

PREVENTING THE NUMBER OF MEETING ATTENDEES AT A VIDEOCONFERENCING ENDPOINT FROM BECOMING UNSAFE

CROSS-REFERENCE TO RELATED APPLICATION

This application claims priority benefit of U.S. Provisional Application No. 63/066,459 which was filed Aug. 17, 2020, and the contents of which are entirely incorporated by reference herein.

TECHNICAL FIELD

This disclosure relates generally to videoconferencing and relates particularly to determining if the number of persons at an endpoint exceeds or is likely to exceed a predetermined capacity.

BACKGROUND

During a videoconference, people at a videoconferencing endpoint interact with people at one or more other videoconferencing endpoints. Attempts to minimize the risk that too many people are or will be present at an endpoint using people detection methods have not been wholly successful. Thus, there is room for improvement in the art.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

Figure 1:
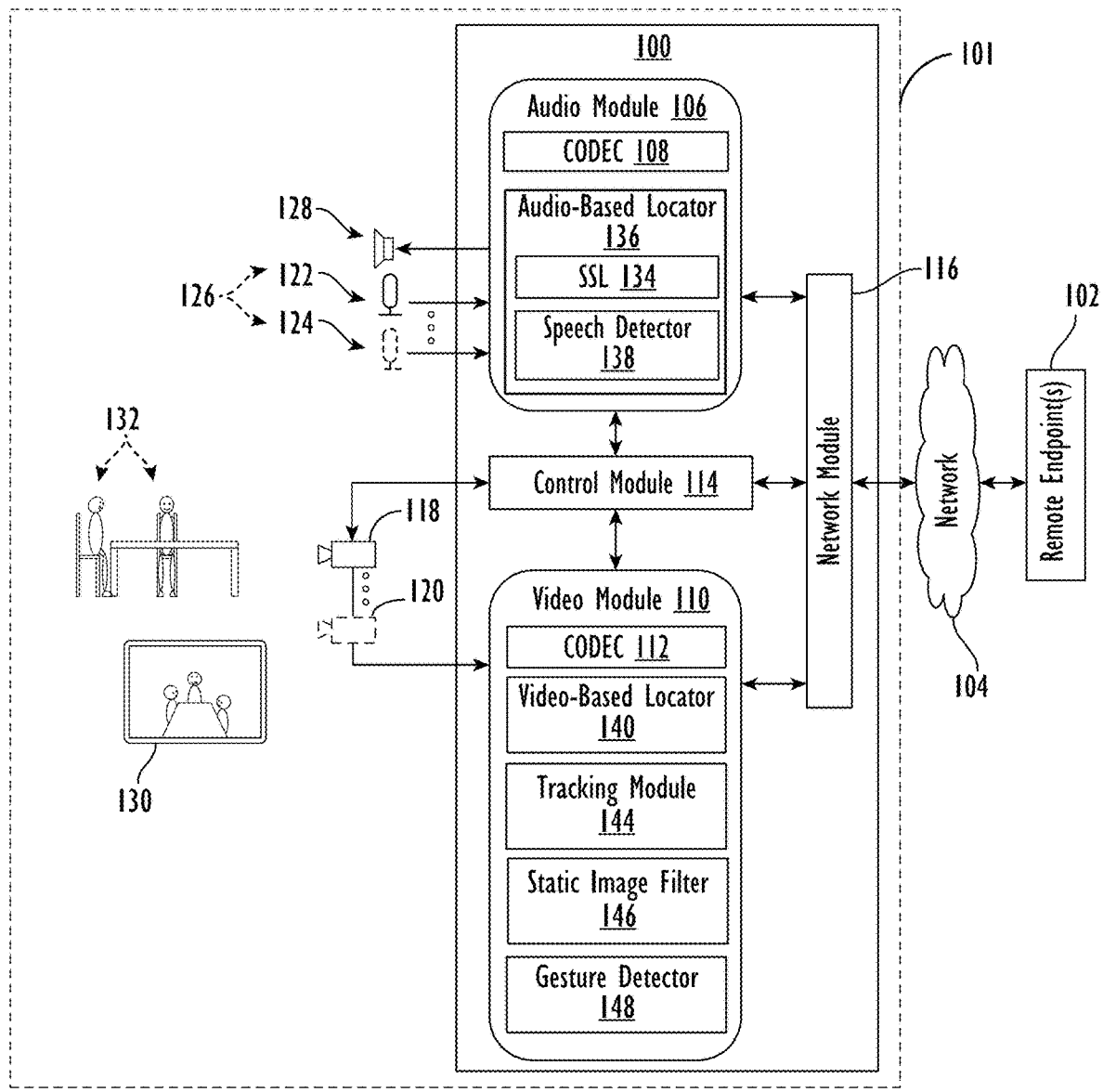
FIG. 1 illustrates a videoconferencing system, in accordance with an example of this disclosure.

In the drawings and the description of the drawings herein, certain terminology is used for convenience only and is not to be taken as limiting the examples of the present disclosure. In the drawings and the description below, like numerals indicate like elements throughout.

In accordance with one or more examples of this disclosure, image data is captured at a videoconferencing endpoint and based on the image data, the number of persons at the videoconferencing endpoint is determined. One or more known methods can be used to detect the presence of persons at an endpoint, such as described in U.S. Pat. No. 9,912,908 to Feng entitled SYSTEM AND METHOD FOR LOCALIZING A TALKER USING AUDIO AND VIDEO INFORMATION and U.S. Pat. No. 10,187,579 to Wang et al. entitled PEOPLE DETECTION METHOD FOR AUTO-FRAMING AND TRACKING IN A VIDEO CONFERENCE. U.S. Pat. No. 9,912,908 and U.S. Pat. No. 10,187,579 are fully incorporated by reference herein. If the number of persons at an endpoint exceeds a safety threshold, such as determined by the Centers for Disease Control and Prevention or the World Health Organization, various actions can be implemented, such as issuing auditory and/or visual warnings at the endpoint.

In some examples of this disclosure, if a meeting room is over capacity, one or more alerts can be issued indicating that the room must be deep cleaned. The same systems that can detect that a meeting room has exceeded capacity can determine whether a deep dean has been performed.

In some examples, an active meeting can be stopped or halted with an on-screen warning if meet capacity goes over during the active meeting. In some examples, one or more alternate locations for some or all meeting participants to use for the meeting can be suggested.

In at least one example, all meetings can be blocked until the room is properly cleaned, such as by preventing users from scheduling meetings using the room and/or locking doors to the room. For example, for rooms with badge access controls, access can be restricted until a room has been properly cleaned.

In accordance with some examples, meetings which would otherwise cause rooms to exceed capacity can be prevented, such as by prompting a meeting organizer to move to a higher capacity available room, or by prompting the meeting organizer to move the meeting to an online virtual environment.

In some examples, Internet of Things (IOT) integration with meeting rooms can cause lighting conditions to change when capacity is exceeded, e.g., causing room to be illuminated in red. In some examples, overcapacity personal alerts through web-based systems such as POLY Lens can generate IT tickets via 3rd party ticket issuing platforms, text messages, emails, and other application programming interfaces (API).

Additionally, the number of times a room is used beyond safety capacity can be tracked over time. E.g., overcapacity trends can generate POLY Lens Insights for facilities, human resources (HR), and information technology (IT) departments to properly manage their spaces and communicate space usage to their employees. At least one technological advantage of such tracking is that it can be used to determine if there are individuals who tend to cause meeting spaces to exceed capacity or who frequently try to overbook meeting rooms. Another benefit of one or more examples of this disclosure is that they can identify rooms that are often overbooked or overcrowded as well as when such overbooking and overcrowding tends to occur.

Benefits of one or more examples of this disclosure include, but are not limited to, understanding room/building/facility trends alongside environmental data, enabling system providers to make better informed unified collaboration investment decisions about device adoption.

Examples of this disclosure also enable system providers to understand how rooms are used, when rooms are used, and by how many people. Examples of this disclosure also enable system providers to gain a window into collaboration environments across an entire organization, with a spotlight on how spaces and devices are being used.

One or more examples of this disclosure utilize one or more methods of using computer vision/machine learning (via Lens Cloud) and a Poly Video device to determine the appropriate room occupancy levels during pandemics. This information can be used to generate "over occupancy" personnel alerts for management. Such alerts can be used to correct over occupancy behavior in meeting spaces.

FIG. 1 illustrates a videoconferencing system 100 at a videoconferencing endpoint 101, in accordance with an example of this disclosure. The videoconferencing system 100 includes multiple components to provide a pleasant videoconferencing experience. The videoconferencing system 100 enables people at the videoconferencing endpoint 101 to communicate with people at one or more remote videoconferencing endpoints 102 over a network 104. Components of the (videoconferencing) system 100 include an audio module 106 with an audio codec 108, and a video module 110 with a video codec 112. Video module 110 includes a video-based locator 140, which is used to locate videoconference participants 132 during videoconferences. Video module 110 also includes a tracking module 144, which is used to track the locations of videoconference participants 132 at the videoconferencing endpoint 101. Video module 110 also includes a static image filter 146 which can be used to detect static portions of video image frames and minimize potential tracking errors. Video module 110 also includes a gesture detector 148, which can be used to detect when a (videoconference) participant 132 makes a gesture such as waving their hand or raising their hand. Audio module 106 and video module 110 are operatively coupled to a control module 114 and a network module 116. The (videoconferencing) system 100 includes and/or is coupled to least one camera 118 at the (videoconferencing) endpoint 101. The camera(s) 118 can be used to capture a video component of a data stream at the endpoint 101. Such a data stream contains a series of frames, which can include image frames and related audio; a given image frame can consist of one or more contiguous and/or non-contiguous image frames as well as one or more overlapping or non-overlapping image frames. In some examples of this disclosure, the endpoint 101 includes one or more additional cameras 120. The camera(s) 118 can be used to detect (video) data indicating a presence of one or more persons (e.g., participants 132) at the endpoint 101. In some examples, when a participant 132 is zoomed in upon by a camera (e.g., 118), a sub-portion of the captured image frame containing the participant 132 is rendered—e.g., displayed on a display 130 and/or transmitted to a remote endpoint 102—whereas other portions of the image frame are not.

During a videoconference, camera 118 captures video and provides the captured video to the video module 110. In at least one example of this disclosure, camera 118 is an electronic pan-tilt-zoom (EPTZ) camera. In some examples, camera 118 is a smart camera. In some examples, camera 118 is an EPTZ camera and is also a smart camera. In some examples, one or more additional cameras (e.g., 120) can be cascaded with camera 118 such that camera 118 controls some or all operations of such additional cameras. In accordance with one or more examples of this disclosure, one or more cameras (e.g., 118, 120) are releasably coupled to one or more processors of the system 100 (e.g., 208, shown in FIG. 2). Additionally, one or more microphones (e.g., 122, 124) capture audio and provide the captured audio to the audio module 106 for processing. The captured audio and concurrently captured video can form a data stream. (See preceding paragraph.) Microphone 122 can be used to detect (video) data indicating a presence of one or more persons (e.g., participants 132) at the endpoint 101. Microphone 122 can be a table or ceiling microphone or be part of a microphone pod or the like. In one or more examples, microphones 122, 124 are tightly coupled with camera 118. The system 100 can use the audio captured with microphone 122 as conference audio.

In some examples, the microphones 122, 124 can reside within a microphone array (e.g., 126) that includes both vertically and horizontally arranged microphones for determining locations of audio sources, e.g., participants 132 who are speaking. In some examples, the system 100 uses audio from one or more microphones (e.g., 122, 124) for participant tracking purposes. In some examples, the system 100 uses audio from microphones 122, 124 for camera tracking. In one or more examples, the system 100 uses audio from microphones 122, 124 to determine locations of (videoconference) participants 132.

After capturing audio and video, the system 100 encodes the captured audio and video in accordance with an encoding standard, such as MPEG-1, MPEG-2, MPEG-4, H.261, H.263 and H.264. Then, the network module 116 outputs the encoded audio and video to the remote endpoints 102 via the network 104 using an appropriate protocol. Similarly, the network module 116 receives conference audio and video through the network 104 from the remote endpoints 102 and transmits the received audio and video to their respective codecs 108/112 for processing. Endpoint 101 also includes a loudspeaker 128 which outputs conference audio, and a display 130 which outputs conference video.

Using camera 118, the system 100 can capture a view of a room at the endpoint 101, which would typically include all (videoconference) participants 132 at the endpoint 101, as well as some of their surroundings. According to some examples, the system 100 uses camera 118 to capture video of one or more participants 132, including one or more current talkers, in a tight or zoom view. In at least one example, camera 118 is associated with a sound source locator (e.g., 134) of an audio-based locator (e.g., 136).

In one or more examples, the system 100 may use the audio-based locator 136 and a video-based locator 140 to determine locations of participants 132 and frame views of the environment and participants 132. In one or more examples, the system 100 may use the audio-based locator 136 and a video-based locator 140 to determine the number of participants 132 at a meeting location. The control module 114 may use audio and/or video information from these locators 136, 140 to crop one or more captured views, such that one or more subsections of a captured view will be displayed on a display 130 and/or transmitted to a remote endpoint 102.

In some examples, to determine how to configure a view, the control module 114 uses audio information obtained from the audio-based locator 136 and/or video information obtained from the video-based locator 140. For example, the control module 114 may use audio information processed by the audio-based locator 136 from one or more microphones (e.g., 122, 124). In some examples, the audio-based locator 136 includes a speech detector 138 which can be used to detect speech in audio captured by microphones 122, 124 to determine a location of a current participant 132. In some examples, the control module 114 uses video information captured using camera 118 and processed by the video-based locator 140 to determine whether the number of participants 132 at a location has exceeded a safety margin. In some examples, the control module 114 can determine what action(s) to take if the number of participants 132 at a location is too high, such as using one or more speakers to direct participants 132 to leave the room.

Figure 2:
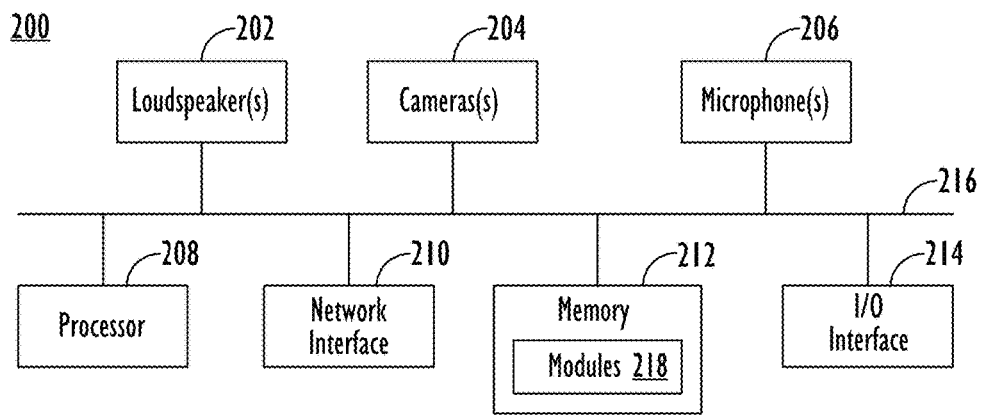
FIG. 2 illustrates aspects of the videoconferencing system, in accordance with an example of this disclosure.

FIG. 2 illustrates components 200 of the videoconferencing system 100, in accordance with an example of this disclosure. The components 200 include one or more loudspeaker(s) 202 (e.g., 128), one or more camera(s) 204 (e.g., 118) and one or more microphone(s) 206 (e.g., 122, 124). The components 200 also include a processor 208, a network interface 210, a memory 212 and a general input/output interface 214, all coupled by bus 216.

The memory 212 can be any standard memory such as SDRAM. The memory 212 stores modules 218 in the form of software and/or firmware for controlling the system 100. In addition to audio codec 108 and video codec 112, and other modules discussed previously, the modules 218 can include operating systems, a graphical user interface that enables users to control the system 100, and algorithms for processing audio/video signals and controlling the camera(s) 204. In at least one example of this disclosure, one or more of the cameras 204 can be a panoramic camera.

The network interface 210 enables communications between the endpoint 101 and remote endpoints 102. In one or more examples, the interface 210 provides data communication with local devices such as a keyboard, mouse, printer, overhead projector, display, external loudspeakers, additional cameras, and microphone pods, etc.

The camera(s) 204 and the microphone(s) 206 capture video and audio in the videoconference environment, respectively, and produce video and audio signals transmitted through bus 216 to the processor 208. In at least one example of this disclosure, the processor 208 processes the video and audio using algorithms of modules 218. For example, the system 100 processes the audio captured by the microphone(s) 206 as well as the video captured by the camera(s) 204 to determine the location of participants 132 and control and select from the views of the camera(s) 204. Processed audio and video can be sent to remote devices coupled to network interface 210 and devices coupled to general interface 214. Data concerning room usage can also be sent to remote devices coupled to network interface 210 and devices coupled to general interface 214.

Figure 3:
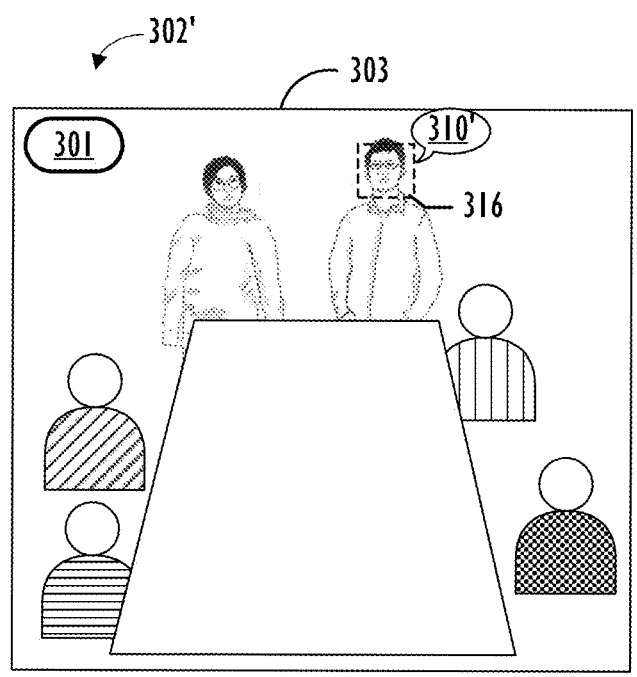
FIG. 3 illustrates a face/audio-based person detection method, in accordance with an example of this disclosure.

FIG. 3 illustrates a process of the system 100 for detecting and counting people at an endpoint 301, in accordance with an example of this disclosure. FIG. 3 shows a first image frame 303 captured at an endpoint 301 (e.g., 101) by the system 100 while operating in a group view mode 302. The first image frame 303 shows the endpoint 301 in a group view 308. The system 100 detects audio 310 and locates Tianran WANG's face within a face box 316, thus identifying him as a person. Alternately, he can be determined to be a person based solely on facial data 316.

Figure 4:
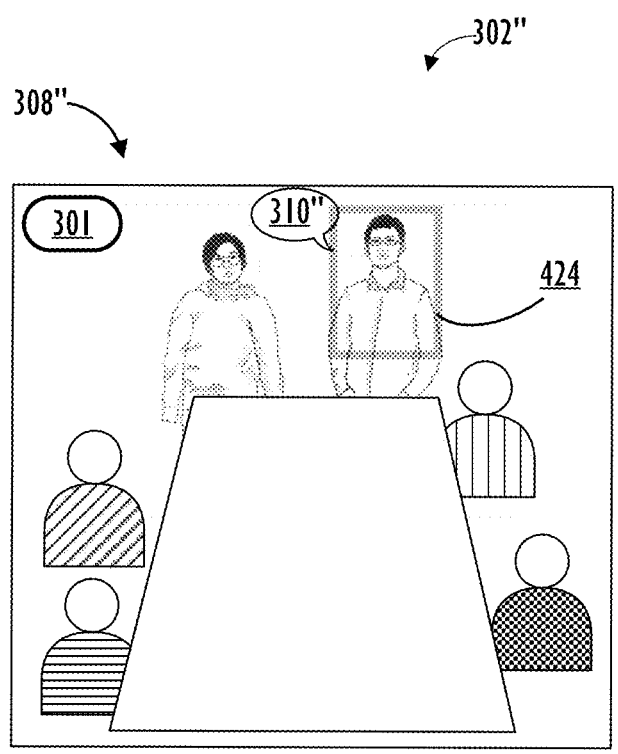
FIG. 4 illustrates an upper body-based person detection method, in accordance with an example of this disclosure.

Alternately, Tianran WANG can be identified as a person within an upper body box 424 as illustrated in FIG. 4. All persons at the endpoint 301 can be likewise detected (in FIGS. 3-4 there are six people at the endpoint 301).

Figure 5:
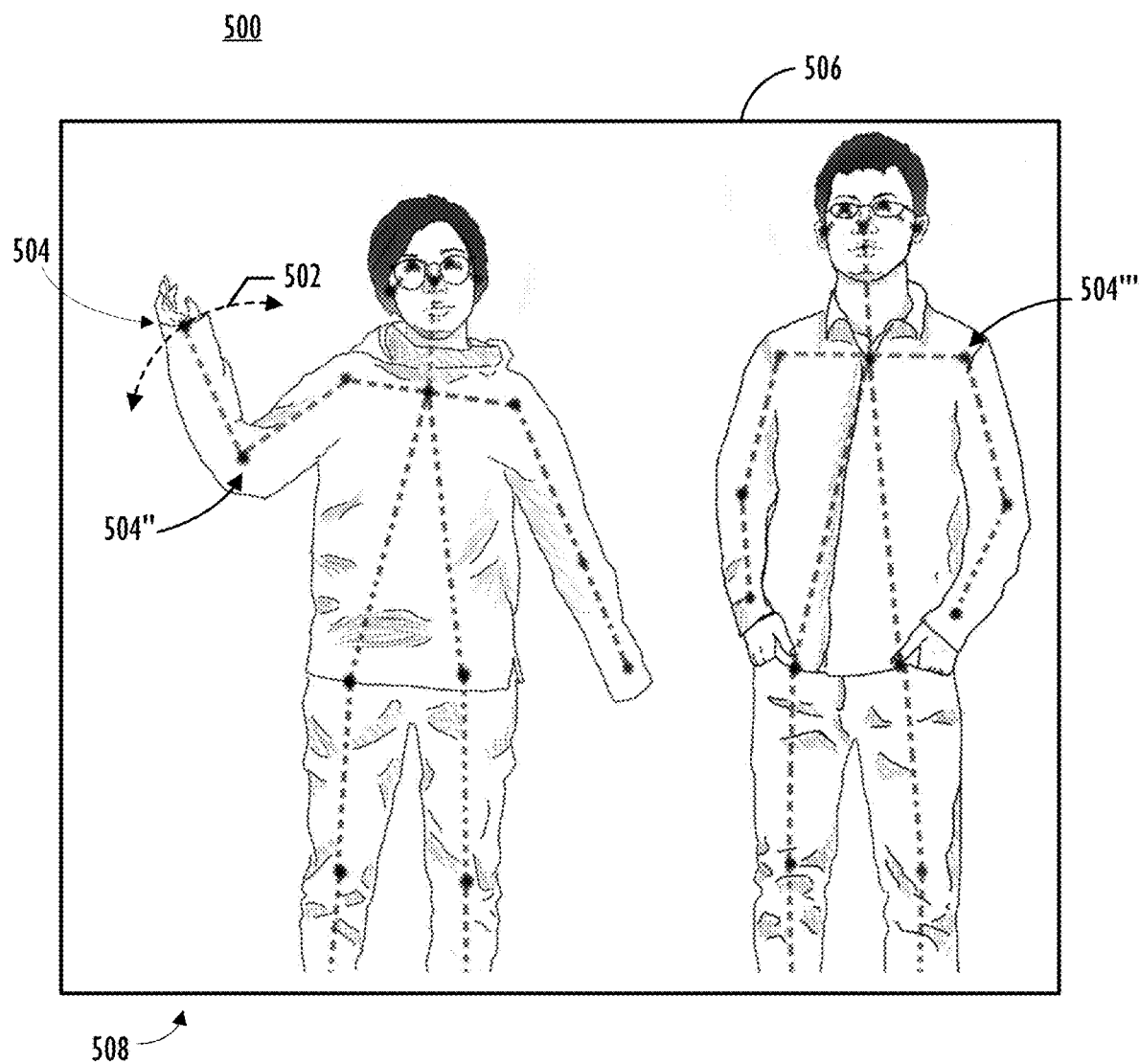
FIG. 5 illustrates a key point-based person detection method, in accordance with an example of this disclosure.

FIG. 5 illustrates aspects of a method 500 of detecting (and counting) people based on key points 504, in accordance with an example of this disclosure. Hand waving or a similar attention seeking gesture 502 can indicate a presence of one or more persons (e.g., participants 132) at an endpoint 101. FIG. 5 shows an image frame 506 captured by the system 100 in which Xi LU and Tianran WANG are standing in a group view 508. Xi LU is waving her right hand. Method 500 is a bottom up detection method 500 for detecting attention gestures. In the bottom up detection method 500, key points 504 are detected from the image frame 506 and then whether a participant 132 is performing an attention gesture is detected from the key points 504 detected from one or more images 506. In at least one example of this disclosure, a key point 504 is a reference location that is a defined location with respect to a human body. For example, key points 504 for the location of feet, knees, hips, hands, elbows, shoulders, head, face, etc. can be detected from the image frame. In one or more examples, the system 100 uses a machine learning model that includes an artificial neural network with one or more convolutional layers to generate the key points 504 from the image frame. The machine learning model may be trained using backpropagation to update the weights of the machine learning model.

Examples of neural networks for key point detection include PoseNet detector and OpenPose detector, which take an image frame as input data and generate locations and confidence scores for key points 504 as output data. The number of layers used in the networks may be based on which network architecture is loaded. As an example, when using PoseNet detector with a MobileNetV1 architecture and a 0.5 multiplier, the number of layers may be 56.

In one or more examples, the system 100 analyzes the location of a set of key points 504 in a series of image frames over a duration of time to determine whether participants 132 are present. For example, when the system 100 determines—using the gesture detector 148—that a hand key point 504 is above the elbow key point 504" or a shoulder key point 504''' of a participant 132, the system 100 may determine that the participant 132 has raised their hand to request attention. As another example, the key points 504 from a set of multiple image frames may be analyzed to determine that a participant 132 is waving a hand back and forth to request attention. The analysis of the key points 504 may be performed directly by identifying the relative positions, velocities, and accelerations of the key points 504 of a participant 132 to a set of threshold values for the attention gestures. In one or more examples of this disclosure, analysis of key points 504 may be performed using an additional machine learning model that takes the set of key points 504 over time as an input and outputs whether an attention gesture has been performed and may utilize an artificial neural network model in addition to the artificial neural network used to generate the key points 504 from the image frame 506. Examples of neural networks for person detection from key points 504 include spatial temporal graph convolutional network (ST-GCN) and hybrid code network (HCN).

In some examples of this disclosure, the system 100 uses top down detection to detect attention seeking gestures 502. In top down detection, whether a participant 132 is present in the image frame 506 and the location of the participant 132 are first detected, and then whether the participant 132 is performing an attention gesture may be determined based on the location of the participant 132. In some examples of this disclosure, the system 100 uses top down detection with a machine learning model that takes an image frame 506 as input and outputs the location of a participant 132 within the image frame 506. The machine learning model may include an artificial neural network with multiple convolutional layers that identify the pixels of the image frame 506 that include the participant 132. Examples of neural network models for recognizing persons and gestures include the T3D model and the DenseNet3D model. The neural network model may take a sequence of images as input data and output a gesture label that designates whether a participant 132 is waving a hand or not.

Figure 6:
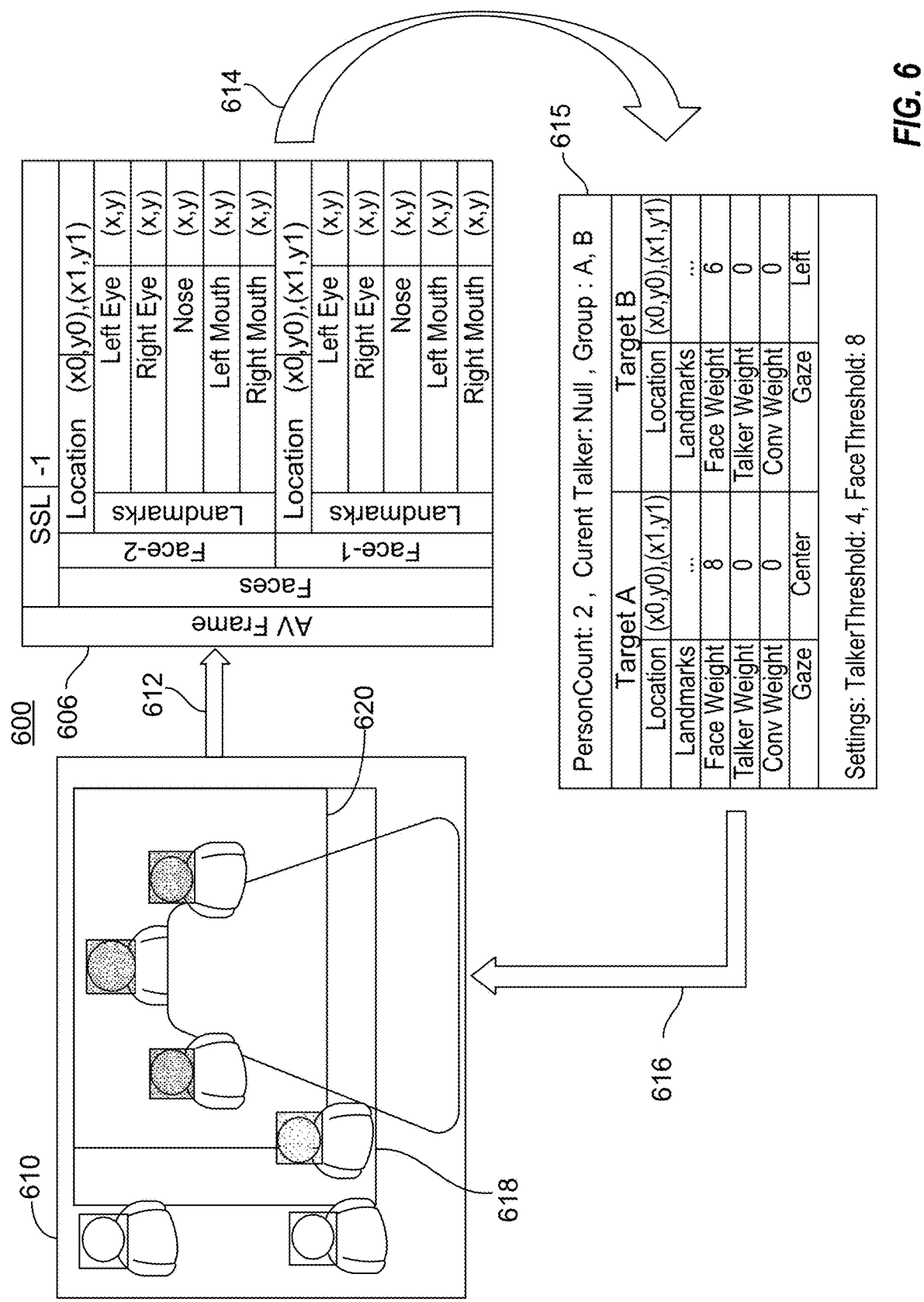
FIG. 6 illustrates an audio-visual map process cycle, in accordance with an example of this disclosure.

FIG. 6 illustrates an audio-visual frame and audio-visual map process cycle 600, in accordance with an example of this disclosure. A frame 610 is captured by the system 100, and information of that frame 610 is organized 612 into an audio-visual frame 606. The audio-visual frame 606 is ingested 614 into the audio-visual map 615. And based on the audio-visual map 615, a first sub-frame 618 can be selected 616 and/or a second sub-frame 620 can be selected 616 for rendering. The audio-visual map 615 is updated on an ongoing basis, enabling the system 100 to keep track of the number of participants (132) at a meeting location. Frame 610 contains six participants.

Figure 7:
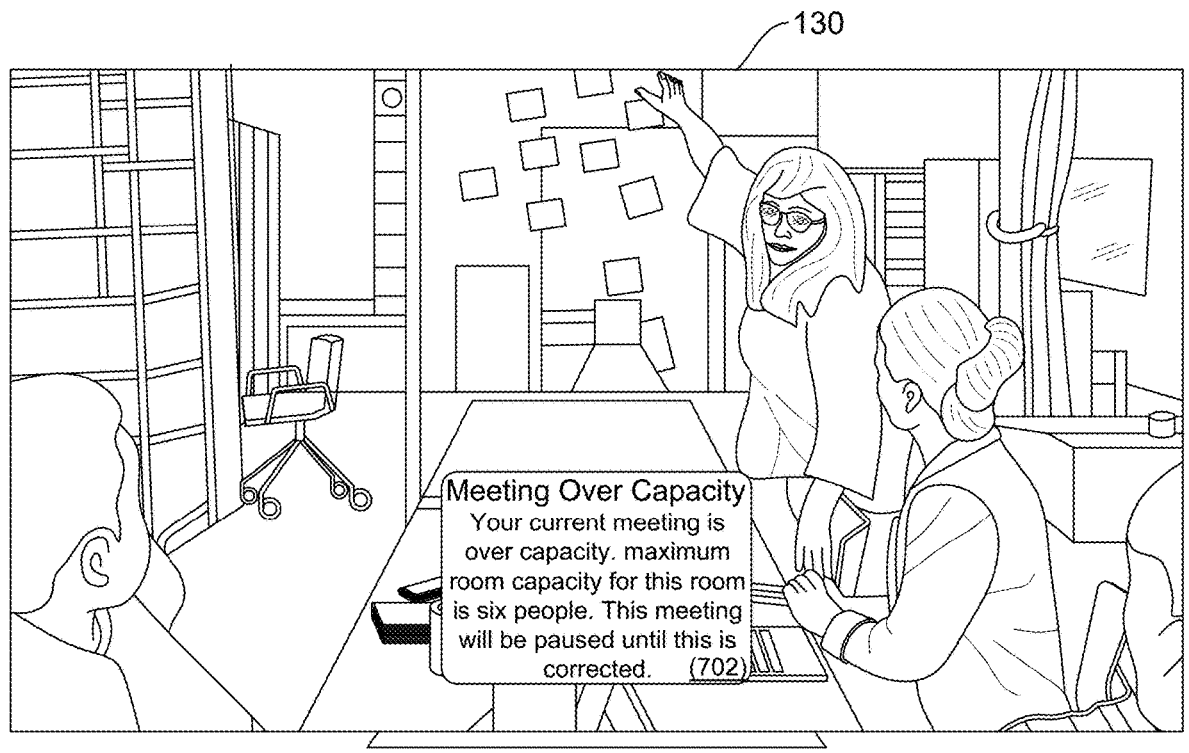
FIG. 7 illustrates a display device rendering an over-capacity alert message, in accordance with an example of this disclosure.

FIG. 7 illustrates a display device 130 rendering an over-capacity alert message 702, in accordance with an example of this disclosure.

Figure 8:
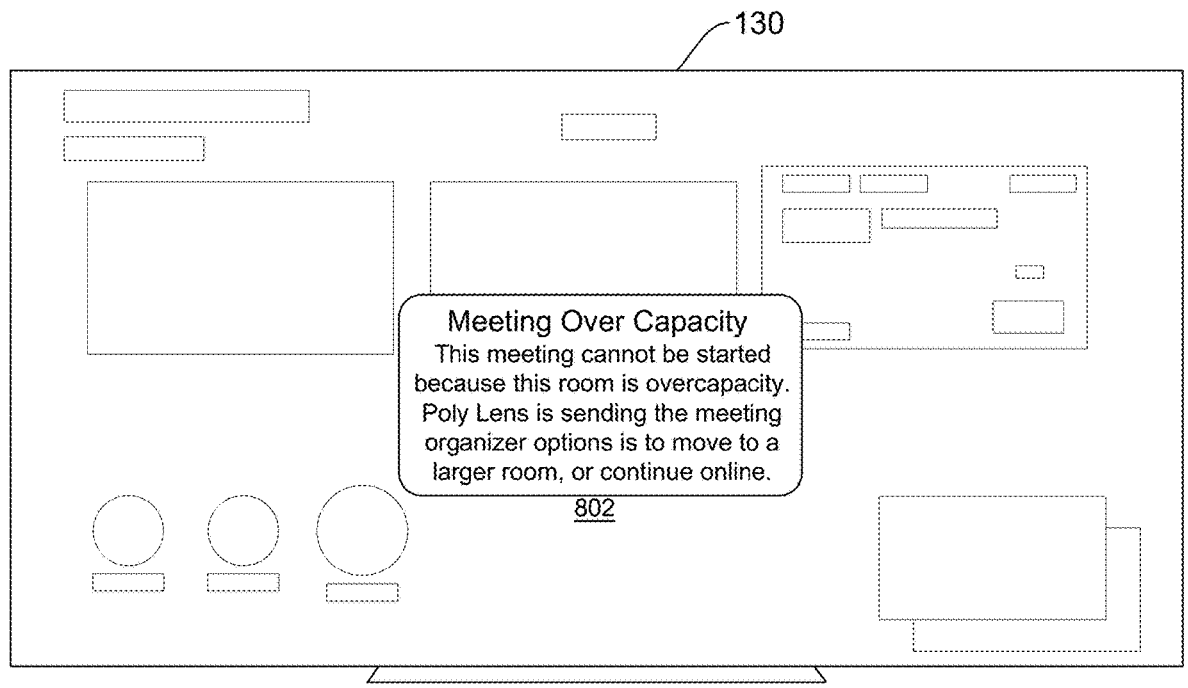
FIG. 8 illustrates a display device rendering another over-capacity alert message, in accordance with an example of this disclosure.

FIG. 8 illustrates a display device 130 rendering another over-capacity alert message 802, in accordance with an example of this disclosure.

Figure 9:
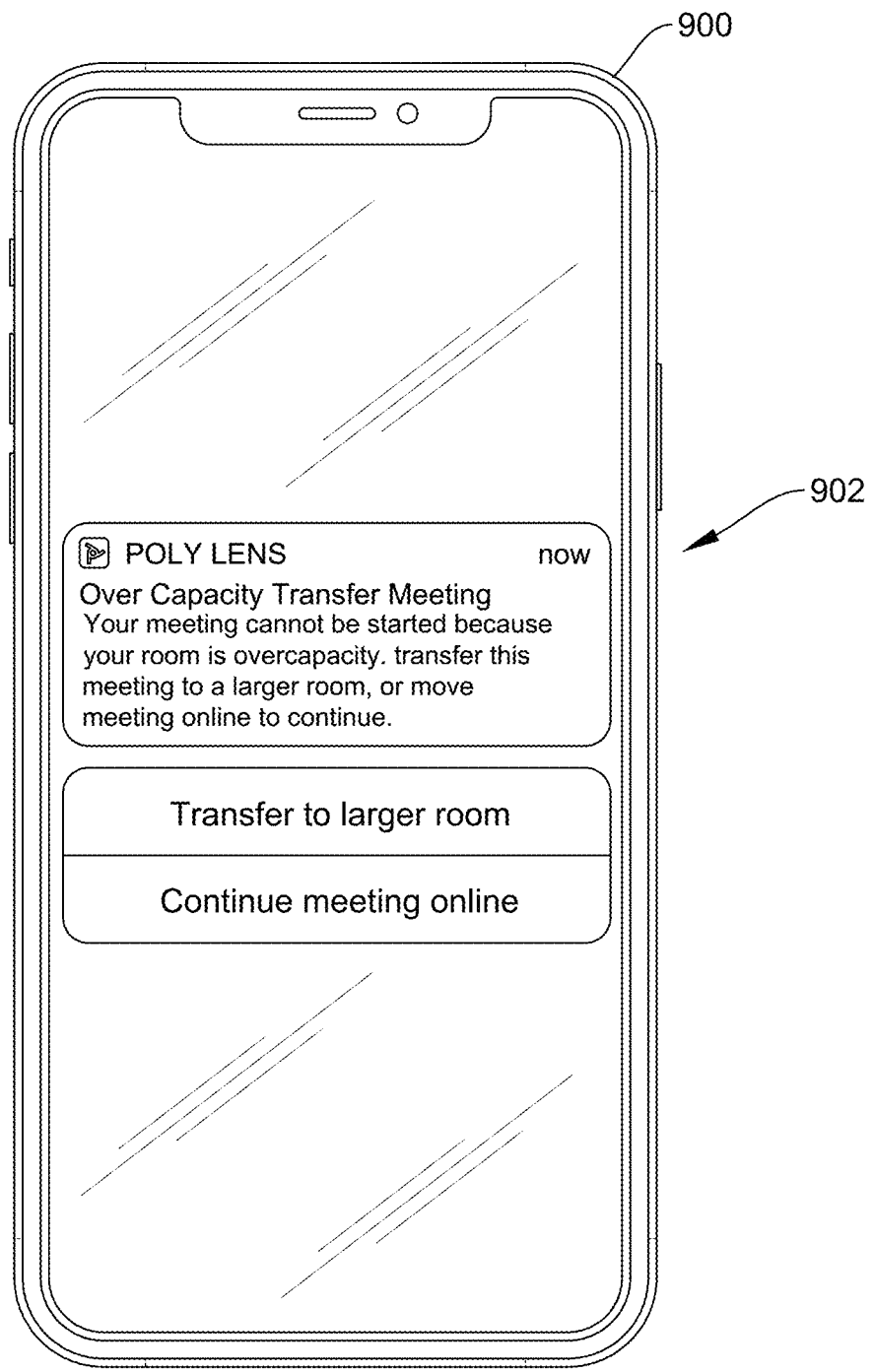
FIG. 9 illustrates an electronic device prompting a meeting organizer to make alternate meeting plans, in accordance with an example of this disclosure.

FIG. 9 illustrates an electronic device 900 issuing an alert message 902 prompting a meeting organizer to make alternate meeting plans, in accordance with an example of this disclosure.

Figure 10:
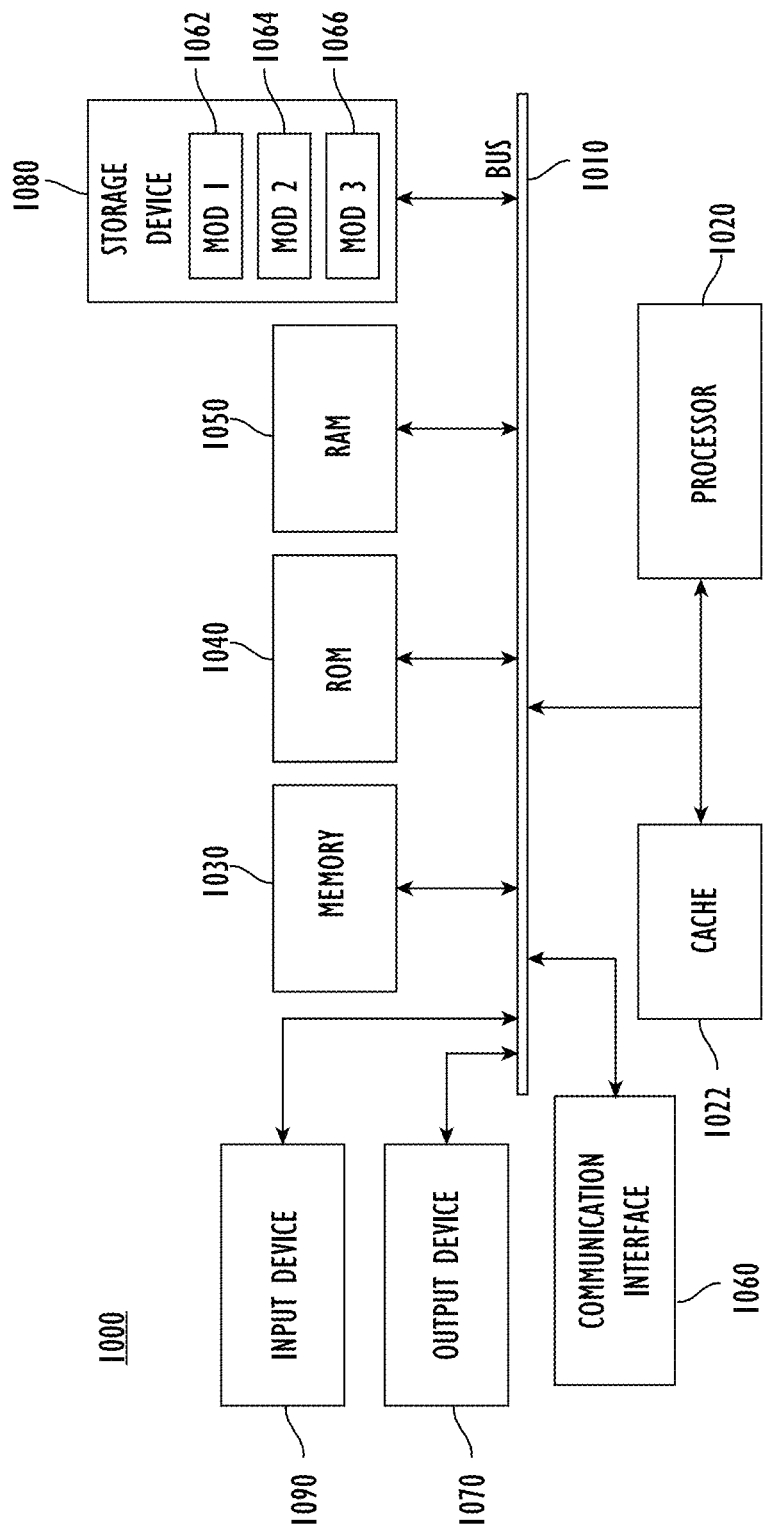
FIG. 10 illustrates an electronic device which can be used to practice one or more methods of this disclosure.

FIG. 10 illustrates an electronic device 1000 (e.g., 100, 900) which can be employed to practice the concepts and methods described. The components disclosed described can be incorporated in whole or in part into tablet computers, personal computers, handsets, cloud-based networked servers, and other devices utilizing one or more input devices 1090 such as microphones, keyboards, etc. As shown, device 1000 can include a processing unit (CPU or processor) 1020 (e.g., 208) and a system bus 1010 (e.g., 216). System bus 1010 interconnects various system components—including the system memory 1030 such as read only memory (ROM) 1040 and random-access memory (RAM) 1050—to the processor 1020. The bus 1010 connects processor 1020 and other components to a communication interface 1060 (e.g., 116). The processor 1020 can comprise one or more digital signal processors. The device 1000 can include a cache 1022 of high-speed memory connected directly with, near, or integrated as part of the processor 1020. The device 1000 copies data from the memory 1030 and/or the storage device 1080 to the cache 1022 for quick access by the processor 1020. In this way, the cache provides a performance boost that avoids processor 1020 delays while waiting for data. These and other modules can control or be configured to control the processor 1020 to perform various actions. Other system memory 1030 may be available for use as well. The memory 1030 can include multiple different types of memory with different performance characteristics. The processor 1020 can include any general-purpose processor and a hardware module or software module, such as module 1 (1062), module 2 (1064), and module 3 (1066) stored in storage device 1080, configured to control the processor 1020 as well as a special-purpose processor where software instructions are incorporated into the actual processor design. The processor 1020 may essentially be a completely self-contained computing system, containing multiple cores or processors, a bus, memory controller, cache, etc. A multi-core processor may be symmetric or asymmetric.

The system bus 1010 may be any of several types of bus structures including a memory bus or memory controller, a peripheral bus, and a local bus using any of a variety of bus architectures. A basic input/output system (BIOS) stored in ROM 1040 or the like, may provide the basic routine that helps to transfer information between elements within the device 1000, such as during start-up. The device 1000 further includes storage devices 1080 such as a hard disk drive, a magnetic disk drive, an optical disk drive, tape drive or the like. The storage device 1080 can include software modules 1062, 1064, 1066 for controlling the processor 1020. Other hardware or software modules are contemplated. The storage device 1080 is connected to the system bus 1010 by a drive interface. The drives and the associated computer readable storage media provide nonvolatile storage of computer readable instructions, data structures, program modules and other data for the device 1000. In at least one example, a hardware module that performs a function includes the software component stored in a non-transitory computer-readable medium coupled to the hardware components—such as the processor 1020, bus 1010, output device 1070, and so forth—necessary to carry out the function.

For clarity of explanation, the device of FIG. 10 is presented as including individual functional blocks including functional blocks labeled as a "processor." The functions these blocks represent may be provided using either shared or dedicated hardware, including, but not limited to, hardware capable of executing software and hardware, such as a processor 1020, that is purpose-built to operate as an equivalent to software executing on a general-purpose processor. For example, the functions of one or more processors presented in FIG. 10 may be provided by a single shared processor or multiple processors. (Use of the term "processor" should not be construed to refer exclusively to hardware capable of executing software.) One or more examples of this disclosure include microprocessor hardware, and/or digital signal processor (DSP) hardware, read-only memory (ROM) 1040 for storing software performing the operations discussed in one or more examples below, and random-access memory (RAM) 1050 for storing results. Very large-scale integration (VLSI) hardware examples, as well as custom VLSI circuitry in combination with a general-purpose DSP circuit can also be used.

Figure 11:
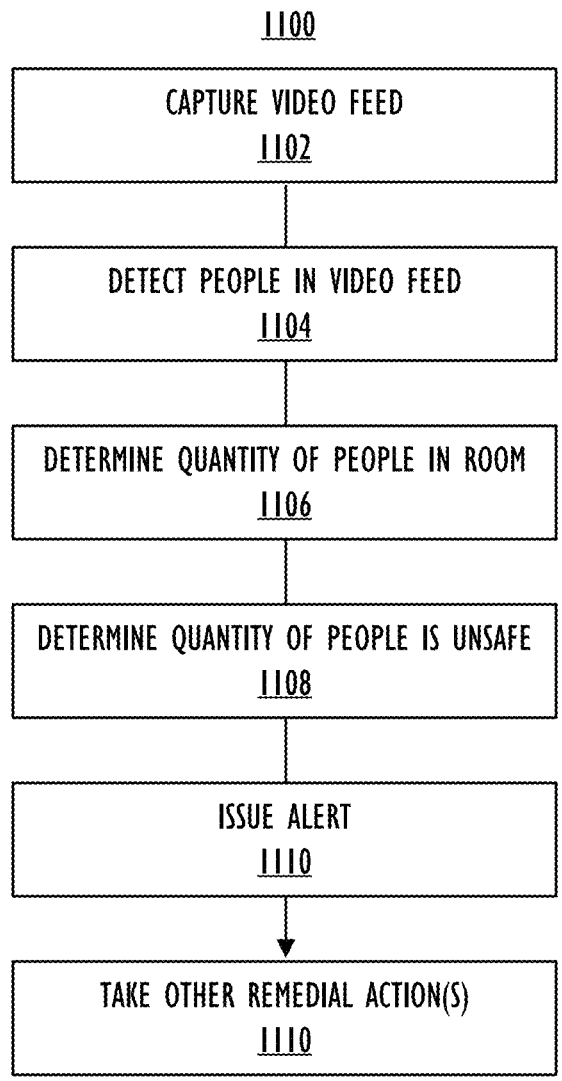
FIG. 11 illustrates a method of managing videoconferencing endpoint capacity, in accordance with an example of this disclosure.

FIG. 11 illustrates a method 1100 of managing videoconferencing endpoint capacity, in accordance with an example of this disclosure. The method includes: capturing 1102 a video feed corresponding to a geographic location; detecting 1104 a presence of one or more persons corresponding to the geographic location, based on data of the video feed; determining 1106 a quantity of persons corresponding to the geographic location, based the data of the video feed; determining 1108 that the quantity of persons corresponding to the geographic location exceeds a first predetermined threshold; and rendering 1110 a first alert message responsive to the determination that the quantity of persons corresponding to the geographic location exceeds the first predetermined threshold. In some examples, the method 1100 also includes implementing one or more additional remedial measures such as those described herein.

Examples of this Disclosure Also Include

1. A method (e.g., 1100) of managing videoconferencing endpoint capacity, comprising: capturing a video feed corresponding to a geographic location; detecting a presence of one or more persons corresponding to the geographic location, based on data of the video feed; determining a quantity of persons corresponding to the geographic location, based the data of the video feed; determining that the quantity of persons corresponding to the geographic location exceeds a first predetermined threshold; and rendering a first alert message responsive to determining that the quantity of persons corresponding to the geographic location exceeds the first predetermined threshold.

2. The method of example 1, further comprising: determining that the quantity of persons corresponding to the geographic location exceeds a second predetermined threshold; and rendering a second alert message responsive to determining that the quantity of persons corresponding to the geographic location exceeds the second predetermined threshold.

3. The method of example 2, wherein the second predetermined threshold exceeds the first predetermined threshold by a predetermined amount.

4. The method of example 2, further comprising: terminating capture of the video feed responsive to determining that the quantity of persons corresponding to the geographic location exceeds the second predetermined threshold.

5. The method of example 1, wherein the geographic location is a room or a building.

6. A videoconferencing system (e.g., 100) comprising: at least one camera configured to capture a video feed corresponding to a geographic location; at least one processor coupled to the at least one camera, wherein the processor is configured to: detect a presence of one or more persons corresponding to the geographic location, based on data of the video feed; determine a quantity of persons corresponding to the geographic location, based the data of the video feed; determine that the quantity of persons corresponding to the geographic location exceeds a first predetermined threshold; and render a first alert message responsive to determining that the quantity of persons corresponding to the geographic location exceeds the first predetermined threshold.

7. The videoconferencing system of example 6, wherein the processor is further configured to: determine that the quantity of persons corresponding to the geographic location exceeds a second predetermined threshold; and render a second alert message responsive to determining that the quantity of persons corresponding to the geographic location exceeds the second predetermined threshold.

8. The videoconferencing system of example 7, wherein the second predetermined threshold exceeds the first predetermined threshold by a predetermined amount.

9. The videoconferencing system of example 7, wherein the processor is further configured to: terminate capture of the video feed responsive to determining that the quantity of persons corresponding to the geographic location exceeds the second predetermined threshold.

10. A non-transitory computer readable medium (e.g., 212) storing instructions executable by a processor, wherein the instructions comprise instructions to: capture a data stream using one or more cameras, the data stream comprising a plurality of frames; detect, in the data stream, data indicating a presence of one or more persons at a videoconferencing endpoint; determine a quantity of persons corresponding to the videoconferencing endpoint based on the data indicating the presence of one or more persons at the videoconferencing endpoint; determine that the quantity of persons corresponding to the videoconferencing endpoint exceeds a first predetermined threshold; and render a first alert message responsive to determining that the quantity of persons corresponding to the videoconferencing endpoint exceeds the first predetermined threshold.

11. The non-transitory computer readable medium of example 10, wherein the instructions further comprise instructions to: determine that the quantity of persons corresponding to the videoconferencing endpoint exceeds a second predetermined threshold; and render a second alert message responsive to determining that the quantity of persons corresponding to the videoconferencing endpoint exceeds the second predetermined threshold.

12. The non-transitory computer readable medium of example 11, wherein the second predetermined threshold exceeds the first predetermined threshold by a predetermined amount.

13. The non-transitory computer readable medium of example 11, wherein the instructions further comprise instructions to: terminate capture of the data stream responsive to determining that the quantity of persons corresponding to the videoconferencing endpoint exceeds the second predetermined threshold.

14. A method of preventing the number of people at location from exceeding a safety limit, comprising: receiving, at a processor (e.g., 208), one or more electronic messages requesting that a meeting be scheduled at a physical location; receiving, at the processor, one or more electronic messages indicating a proposed number of attendees for the meeting at the physical location; determining that the proposed number of attendees exceeds a safety limit previously determined for the physical location; and rendering, using at least one display device, an alert message (e.g., 902).

15. The method of example 14, wherein rendering, using the at least one display device, comprises rendering a message indicating one or more alternate or additional physical locations for the meeting.

The various examples described above are provided by way of illustration and should not be construed to limit the scope of the disclosure. Various modifications and changes can be made to the principles and examples described herein without departing from the scope of the disclosure and without departing from the claims which follow.

The invention claimed is:
1. A method of managing videoconferencing endpoint capacity, comprising:
  capturing a video feed corresponding to a geographic location;
  detecting, based on data of the video feed, a presence of one or more persons corresponding to the geographic location;
  determining, based on the data of the video feed, a quantity of persons corresponding to the geographic location;
  determining that the quantity of persons corresponding to the geographic location exceeds a first predetermined threshold;
  rendering a first alert message responsive to determining that the quantity of persons corresponding to the geographic location exceeds the first predetermined threshold;
  determining that the quantity of persons corresponding to the geographic location exceeds a second predetermined threshold;
  rendering a second alert message responsive to determining that the quantity of persons corresponding to the geographic location exceeds the second predetermined threshold; and issuing a third alert message responsive to determining that the quantity of persons corresponding to the geographic location exceeds the second predetermined threshold,
wherein the third alert message indicates that a room corresponding to the geographic location must be deep cleaned,
wherein the first alert message comprises:
a capacity message indicating that the quantity of persons corresponding to the geographic location exceeds the first predetermined threshold,
wherein determining the quantity of persons corresponding to the geographic location comprises:
detecting a plurality of key points corresponding to each of the one or more persons, and
determining a gesture corresponding to each of the one or more persons based, at least in part, on the detected key points, and
wherein determining the gesture corresponding to at least one of the one or more persons comprises determining that a hand key point is above an elbow key point.

2. The method of claim 1, wherein the second predetermined threshold exceeds the first predetermined threshold by a predetermined amount.

3. The method of claim 1, further comprising:
terminating capture of the video feed responsive to determining that the quantity of persons corresponding to the geographic location exceeds the second predetermined threshold.

4. The method of claim 3, further comprising:
rendering a third alert message indicating one or more alternative locations to the videoconferencing endpoint for a videoconference.

5. The method of claim 1, wherein the geographic location is a room or a building.

6. The method of claim 1, wherein the second predetermined threshold is established in accordance with a determination of the Centers for Disease Control and Prevention.

7. The method of claim 1, wherein the second predetermined threshold is established in accordance with a determination of the World Health Organization.

8. The method of claim 1, further comprising restricting access to the room corresponding to the geographic location.

9. The method of claim 8, further comprising changing lighting conditions of the room.

10. The method of claim 1, wherein at least one hand gesture corresponding to at least one of the one or more persons is a hand waving gesture.

11. The method of claim 1, wherein at least one hand gesture corresponding to at least one of the one or more persons is a hand raising gesture.

12. A videoconferencing system comprising:
at least one camera configured to capture a video feed corresponding to a geographic location; and
at least one processor coupled to the at least one camera, wherein the processor is configured to:
detect, based on data of the video feed, a presence of one or more persons corresponding to the geographic location;
determine, based on the data of the video feed, a quantity of persons corresponding to the geographic location;
determine that the quantity of persons corresponding to the geographic location exceeds a first predetermined threshold;
render a first alert message responsive to determining that the quantity of persons corresponding to the geographic location exceeds the first predetermined threshold;
determine that the quantity of persons corresponding to the geographic location exceeds a second predetermined threshold;
render a second alert message responsive to determining that the quantity of persons corresponding to the geographic location exceeds the second predetermined threshold; and
issuing a third alert message responsive to determining that the quantity of persons corresponding to the geographic location exceeds the second predetermined threshold,
wherein the third alert message indicates that a room corresponding to the geographic location must be deep cleaned,
wherein the first alert message comprises:
a capacity message indicating that the quantity of persons corresponding to the geographic location exceeds the first predetermined threshold,
wherein the plurality of key points corresponding to a first person of the one or more persons includes a hand key point and an elbow key point,
wherein determining the quantity of persons corresponding to the geographic location comprises:
detecting a plurality of key points corresponding to each of the one or more persons, and
determining a gesture corresponding to each of the one or more persons based, at least in part, on the detected key points, and
wherein determining the gesture corresponding to the first person comprises determining that the hand key point is above the elbow key point.

13. The videoconferencing system of claim 12, wherein the second predetermined threshold exceeds the first predetermined threshold by a predetermined amount.

14. The videoconferencing system of claim 12, wherein the processor is further configured to:
terminate capture of the video feed responsive to determining that the quantity of persons corresponding to the geographic location exceeds the second predetermined threshold.

15. A non-transitory computer readable medium storing instructions executable by a processor, wherein the instructions comprise instructions to:
capture a data stream using one or more cameras, the data stream comprising a plurality of frames;
detect, in the data stream, data indicating a presence of one or more persons at a videoconferencing endpoint;
determine a quantity of persons corresponding to the videoconferencing endpoint based on the data indicating the presence of one or more persons at the videoconferencing endpoint;
determine that the quantity of persons corresponding to the videoconferencing endpoint exceeds a first predetermined threshold;
render a first alert message responsive to determining that the quantity of persons corresponding to the videoconferencing endpoint exceeds the first predetermined threshold;
determine that the quantity of persons corresponding to the videoconferencing endpoint exceeds a second predetermined threshold;
render a second alert message responsive to determining that the quantity of persons corresponding to the videoconferencing endpoint exceeds the second predetermined threshold; and
issue a third alert message responsive to determining that the quantity of persons corresponding to the geographic location exceeds the second predetermined threshold, wherein the third alert message indicates that a room corresponding to the geographic location must be deep cleaned, wherein the first alert message comprises:
 a capacity message indicating that the quantity of persons corresponding to the geographic location exceeds the first predetermined threshold, wherein determining the quantity of persons corresponding to the videoconferencing endpoint comprises:
 detecting a plurality of key points corresponding to each of the one or more persons, and
 determining a gesture corresponding to each of the one or more persons based, at least in part, on the detected key points, and wherein determining at least one gesture corresponding to at least one of the persons comprises determining that a hand key point is above an elbow key point.

16. The non-transitory computer readable medium of claim 15, wherein the second predetermined threshold exceeds the first predetermined threshold by a predetermined amount.

17. The non-transitory computer readable medium of claim 15, wherein the instructions further comprise instructions to:
 terminate capture of the data stream responsive to determining that the quantity of persons corresponding to the videoconferencing endpoint exceeds the second predetermined threshold.

* * * * *